United States Patent [19]

Ward

[11] 4,161,986
[45] Jul. 24, 1979

[54] PLOW AND PLOW MOUNTING BRACKET THEREFOR

[75] Inventor: Gerald G. Ward, Naperville, Ill.

[73] Assignee: International Harvester Company, Chicago, Ill.

[21] Appl. No.: 834,629

[22] Filed: Sep. 19, 1977

[51] Int. Cl.² .................... A01B 61/04; A01B 69/08
[52] U.S. Cl. .............................. 172/266; 172/283; 172/647
[58] Field of Search ............. 172/266, 267, 283, 285, 172/287, 291, 569, 647

[56] References Cited

U.S. PATENT DOCUMENTS

| | | | |
|---|---|---|---|
| 2,916,096 | 12/1959 | Miller et al. | 172/291 X |
| 3,920,080 | 11/1975 | Vassiliou | 172/647 X |
| 4,036,305 | 7/1977 | Kinzenbaw | 172/283 |

*Primary Examiner*—Richard T. Stouffer
*Attorney, Agent, or Firm*—James J. Getchius; Neal C. Johnson; F. David AuBuchon

[57] ABSTRACT

A plow mounting bracket for variable width plows including a mounting post having a free end that extends upwardly from a hub portion and is pivotally received by the plow main frame. The plow bracket can be used for plows that are secured at selected widths or plows in which the width can be varied during the operation of the plow.

11 Claims, 6 Drawing Figures

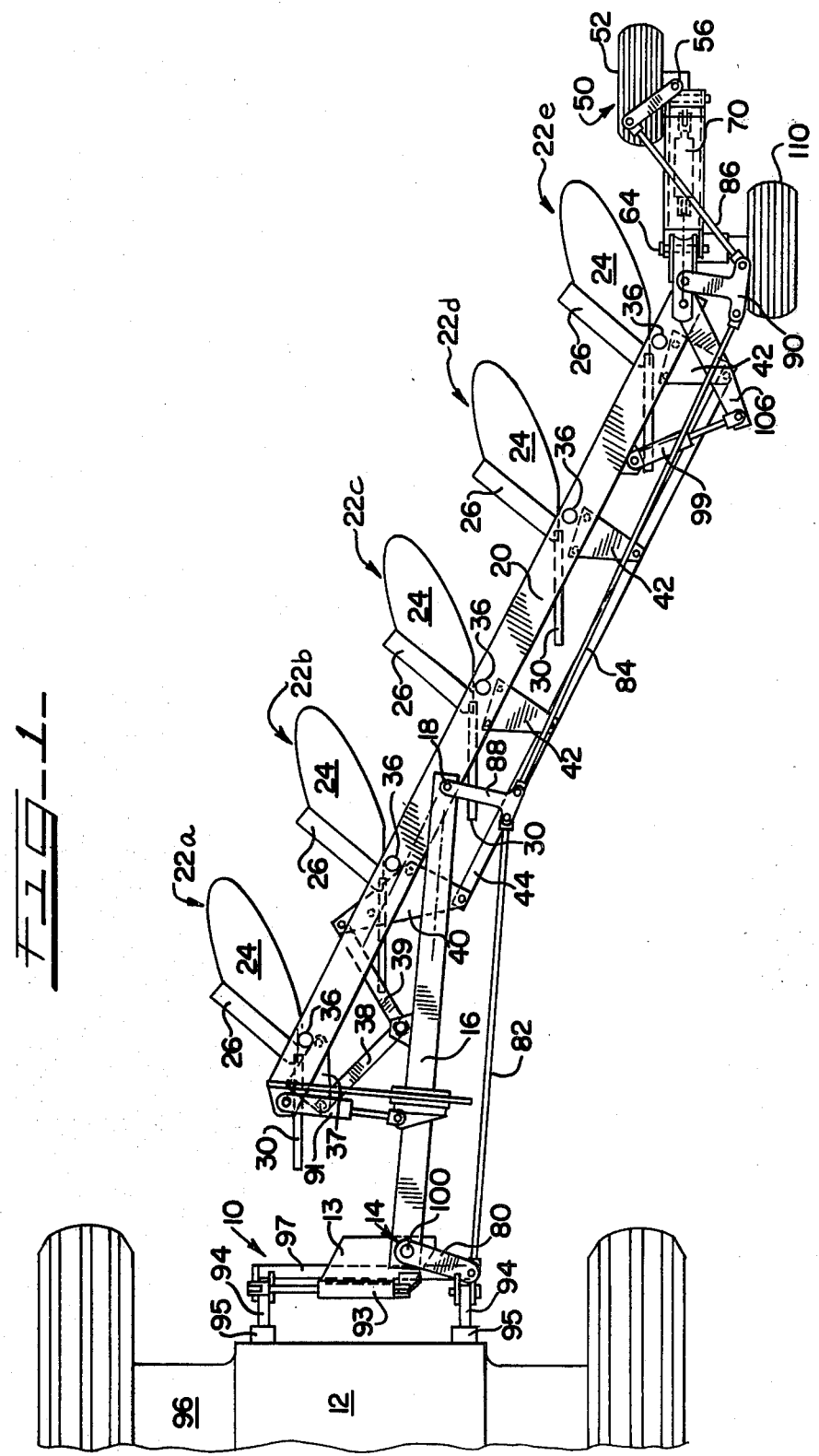

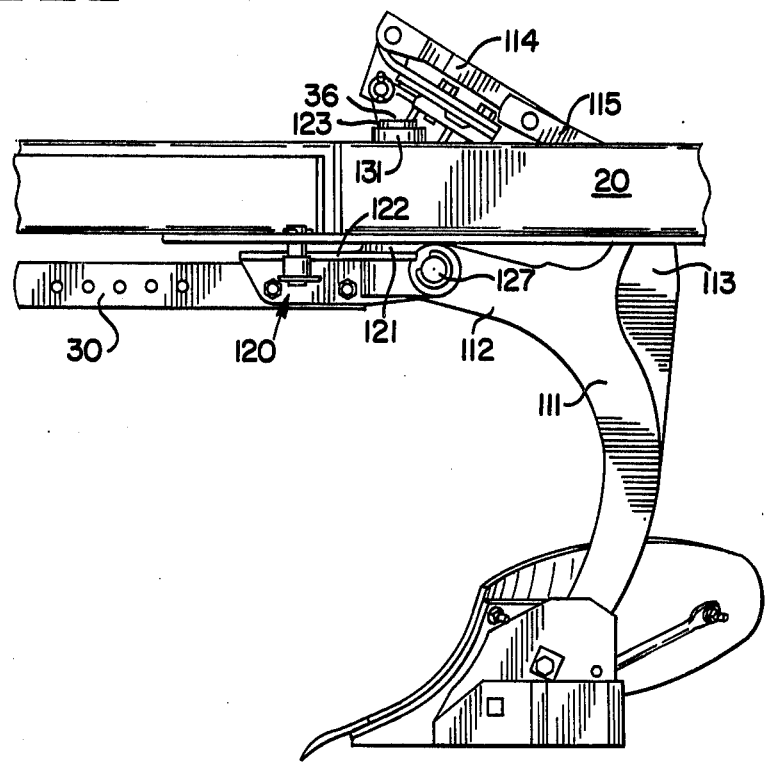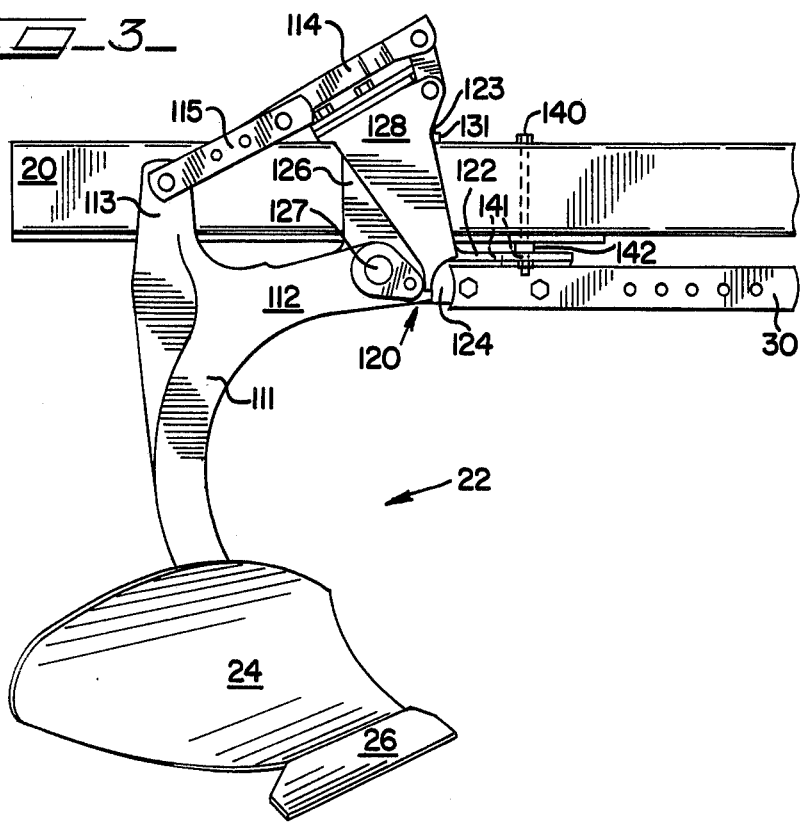

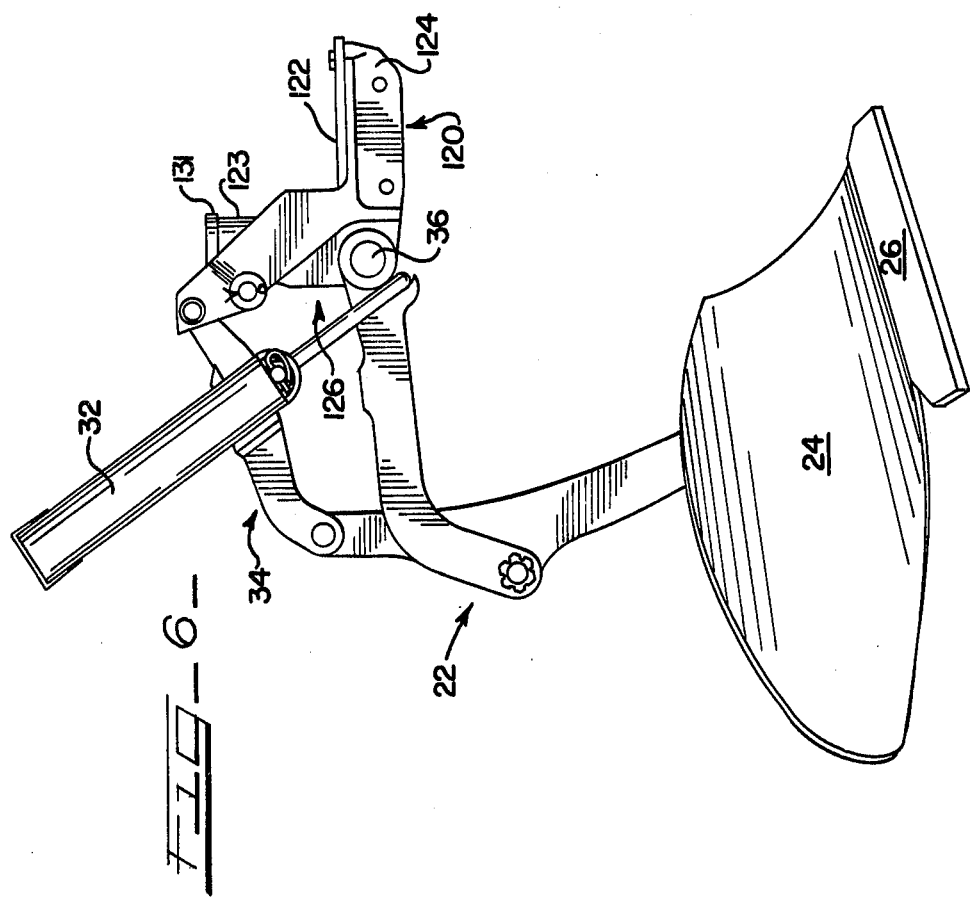
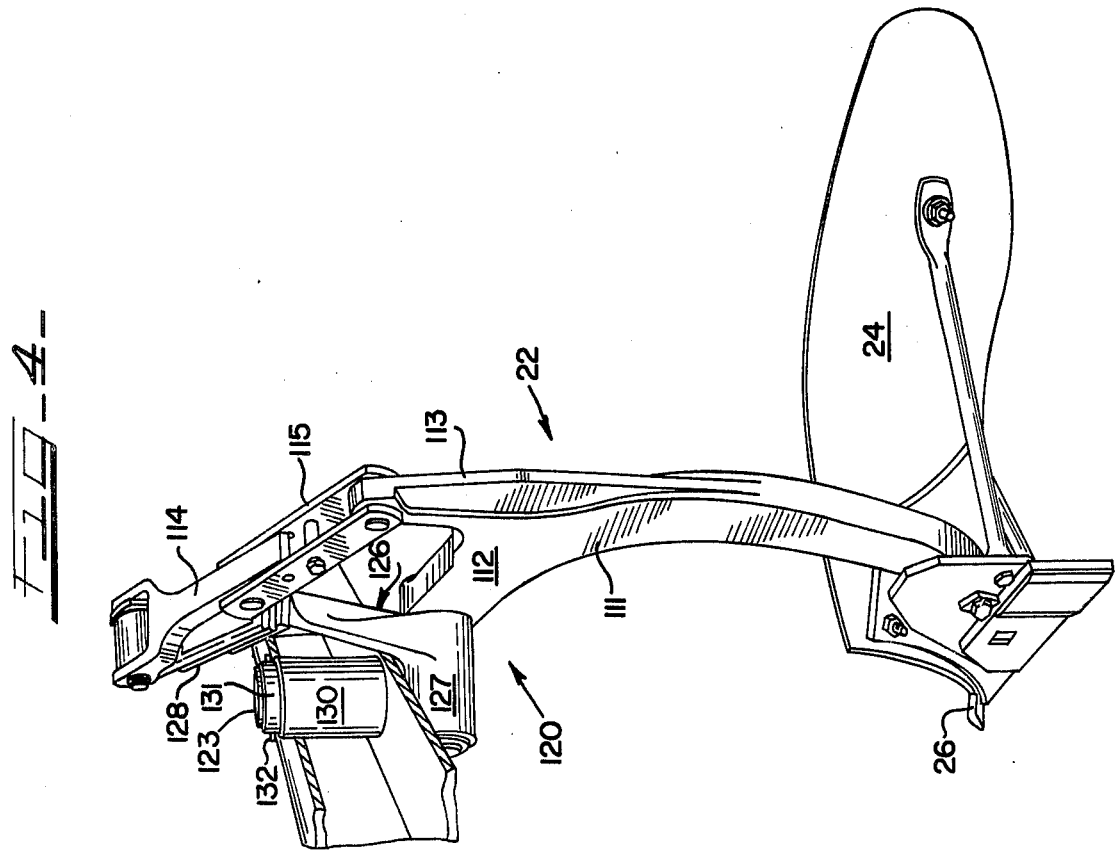

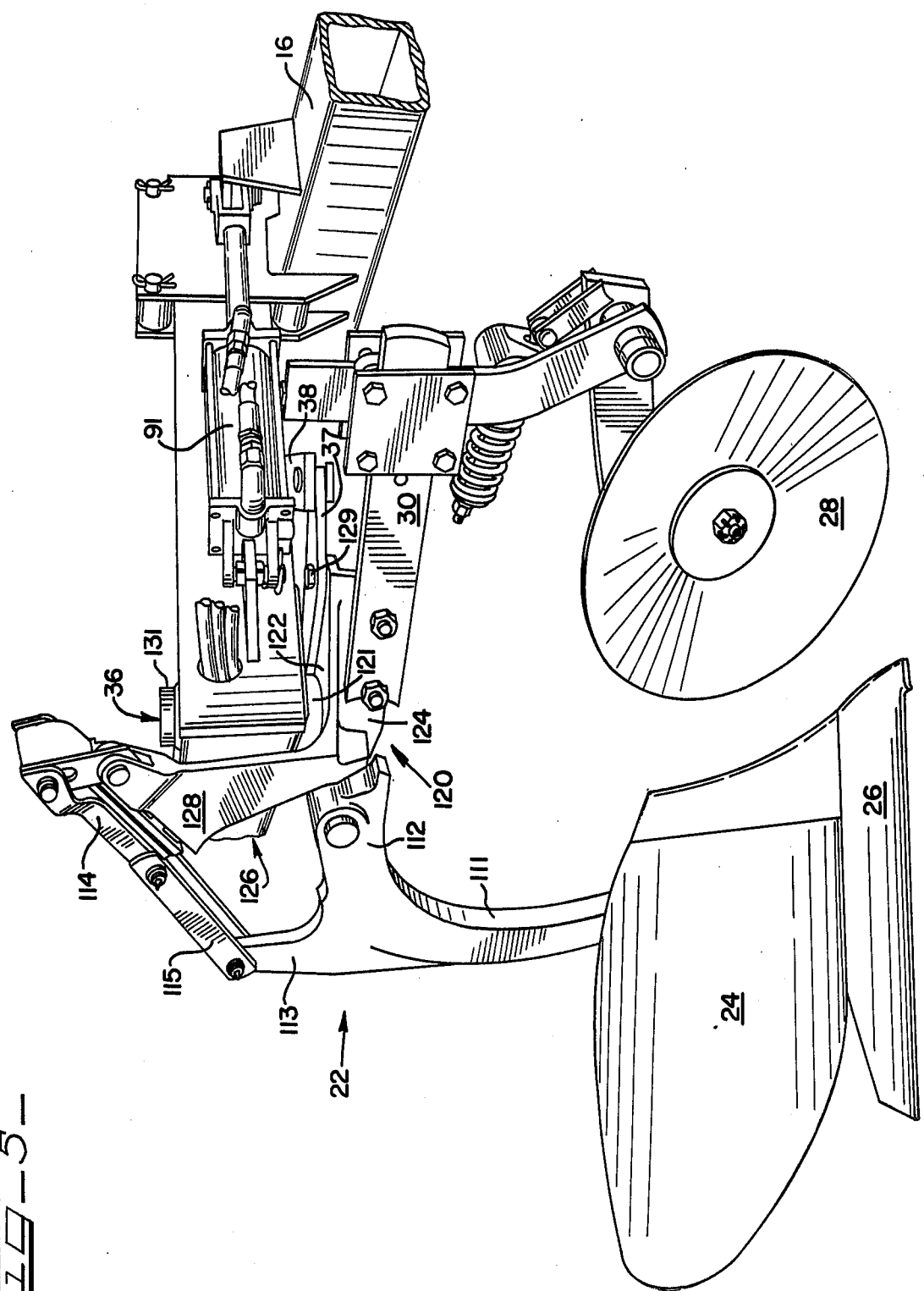

PLOW AND PLOW MOUNTING BRACKET THEREFOR

The present invention relates to agricultural implements and has particular reference to a plow system of the type wherein a plurality of plow units are individually pivotally mounted at predetermined intervals on an elongated frame which is adapted to be pulled behind a tractor, and in which means are provided for adjusting the inclination of the frame relative to the direction of travel of the tractor, to the end that as the angle between the frame and such path of travel is changed, the lateral spacing between adjacent plow units will be commensurately changed to vary the distance between adjacent furrows which are undergoing plowing.

Plow systems of the character set forth above (which for brevity of description will be referred to herein as variable width plows) have recently come into favor in that they are possessed of at least one distinct advantage, namely that the plow units associated therewith are capable of collective positional adjustment under the control of the tractor operator while the plow is in actual use, thus obviating the necessity of the operator having to dismount for the purpose of making numerous bolt hole changes or other adjustments. However, the present invention can also be utilized in plow systems that do not have the ability to be adjusted while the plow is in use but rather are set for a selected furrow width.

Variable width plows of the type shown in U.S. Pat. Nos. 3,817,333, 3,918,528 and 4,036,305 which depend upon varying the angularity of their plow frames or beams for lateral spacing of adjacent plows have been found to be reasonably satisfactory but they have a multiple attachment and multiple component design and requires that their mounting brackets be specifically adapted for the plow system and trip mechanism used and are large and heavy.

The present invention is designed to overcome the above-noted limitation that is attendant upon the construction and use of present day variable width plow systems and, toward this end, the invention contemplates the provision of a plow system wherein, the mounting bracket includes a hub portion that is located below the main frame and has a free ended post extending upwardly therefrom that is pivotally secured to the main frame. The mounting bracket includes means for mounting the plow and for securing it in a selected position relative to the main frame. The mounting bracket as disclosed herein is cast to thus minimize the size and weight and provide structural strength where required. By connecting the free ended post to the hub portion below the main frame the lever arm from the ground working tool to the main frame has been minimized and a means for pivotally connecting the plow bottom to the main frame that is positive and does not permit relative movement or deflection as occurs in multiple components fabrications.

The provision of a plow system such as has been briefly been described above, and possessing the stated advantages, constitutes the principal object of the present invention. Numerous other objects and advantages, not at this time enumerated, will readily suggest themselves as the nature of the invention is better understood.

In the accompanying four sheets of drawings forming a part of this specification, several illustrative embodiment of the invention has been shown.

In these drawings:

FIG. 1 is a plan view, largely schematic in its representation, of a plow system embodying the principles of the present invention and showing the same operatively connected to a motivating tractor;

FIG. 2 is a side perspective view of a single plow device having a first embodiment of a trip mechanism and taken from the leading side of the main frame;

FIG. 3 is a side perspective view of a single plow device having the tripping mechanism of FIG. 2 and showing means for manually securing the plow in fixed adjusted position;

FIG. 4 is a rear perspective view, having a portion broken away, of a single plow device showing the trip mechanism of FIG. 2; and FIG. 5 is a front perspective view of the first plow device in a plow system of the type shown in FIG. 1 and having the trip mechanism of FIG. 2; and FIG. 6 is a side view of a single isolated plow device including the mounting bracket (without the main frame) and including a different trip mechanism.

Before entering into a detailed discussion of the structural features of the present invention, it is deemed pertinent to state that in the following description the terms "right side" and "left side" are used with reference to the path of travel of the tractor when looking forwardly toward the rear end of the latter.

Referring now to the drawings in detail, and in particular to FIG. 1 briefly the plow system of the present invention involves in its general organization a hitch assembly 10 designed for connection to the rear end of a tractor 12, and including a laterally shiftable or adjustable hitch block 13 which provides a pivotal connection 14 for the forward end of a pull frame or bar 16. The rear end of the pull frame 16 has a pivotal connection 18 with the medial region of a main frame 20. Both the pull frame 16 and the main frame 20 are in the form of elongated linearly straight beams having flat upper and lower surfaces, preferably of hollow rectangular tubular construction.

Pivotally mounted on the main frame 20 at equally spaced points therealong are a plurality of plow units or bottoms, each of which has been designated in its entirety by the reference numeral 22a through 22e. The various plow units 22 are of more or less conventional construction and they have been illustrated herein with but little detail. Since they are all identical, a brief description of one of them will suffice for them all. The plow units 22 may be of the general type shown and described in U.S. Pat. No. 3,321,027, granted on May 23, 1967 and entitled "Self Restoring Plow Trip," and for a full understanding thereof, reference may be had to such patent. However, for purposes of discussion herein it is deemed sufficient to state that each unit embodies the usual moldboard 24, plow share 26, and coulter disk 28, the latter underlying a coulter bar 30. Since the specific nature of the various plow units or bottoms 22 per se constitutes no part of the present invention, such units have been fragmentarily shown in the different views. For example, the coulter disks 28 has been shown, only in FIG. 5 and have been omitted from the other Figures in the interests of clarity.

The plow units 22 shown in FIGS. 2-5 inclusive have toggle trip mechanisms of the type shown in U.S. Pat. No. 3,910,354 that issued on Oct. 1, 1975, while the plow unit 22 shown in FIG. 6 has a self-restoring trip type such as is illustrated in the aforementioned U.S. Pat. No. 3,321,027. Portions of the various trip mechanisms associated are shown in FIGS. 2–6 inclusive but are omitted in FIG. 1 in the interests of clarity. The trip mechanism shown in FIG. 6 include dual spring units 32 and toggle devices 34 which are associated therewith but which require no detailed description since they are not germane to the present invention. Each of the plow units or bottoms 22 is capable of bodily swinging movement about a vertical pivotal connection 36 or 127 with the main frame 20.

In the illustrated form of the present plow system, five plow units 22a–22e are disclosed although it will be understood that a greater or a lesser number thereof may be employed if desired. Three of these units are pivotally mounted on the main frame 20 rearwardly of the pivotal connection 18 for the pull frame 16, while the two leading plow units are mounted on the pull frame 16 forwardly of the connection 18. Means are provided whereby all of the plow units 22 are constrained to turn in unison about their respective pivotal connections 36. Furthermore, the extent of turning movement of the various plow units 22 is a function of the angle which is subtended between the axis of the pull frame 16 and the axis of the main frame 20.

Accordingly, insofar as the leading plow unit 22a is concerned, a generally triangular shaped crank arm 37 is connected to the plow unit and projects laterally therefrom beyond the right side of the main frame 20 and is pivotally connected to one end of a draw link 38. The other end of the draw link 38 is pivotally connected to a medial region of the pull frame 16. Thus it will be observed that as the angle between the main frame and the pull frame increases, the draw link 38 will swing the plow unit 22a in a counterclockwise direction as viewed in FIG. 1.

Insofar as the second plow unit 22b is concerned, this unit receives its turning movement from the leading plow unit 22a by reason of a second draw link 39 (FIG. 1) which is pivoted at one end to the pull frame 16 and at its other end to one corner region of a generally triangular crank arm 40, such corner region overhanging the right side of the main beam 20. Thus, as the angle increases, the plow unit 22b will swing counterclockwise in unison with the plow unit 22a.

Insofar as the three rearmost plow units 22c, 22d, and 22e are concerned, each of these units are provided with a generally triangular crank arm 42 which projects outwardly of the left side of the main frame 20. The projecting corner of each of the three crank arms 42 is pivotally connected to an elongated guide bar 44 so that as the latter is shifted generally in an endwise direction, the three plow units 22a, 22b and 22c rotate in unison about their respective pivot connections 36. The forward end of the guide bar 44 is pivoted to a second corner region of the crank arm 40, such corner region projecting outwardly from the left side of the main frame 20 and thus, as the plow unit 22b rotates under the influence of the draw link 39, the guide bar 44 is shifted generally endwise so that the three plow units 22c, 22d and 22e are rotated in unison with the plow units 22a and 22b and in the same direction.

As shown in FIG. 1 the rear or trailing end of the main beam 20 is supported by a trailer section 50 which carries at its rear end a steerable support wheel 52 located in such a manner that it follows the furrow which is formed by the rearmost plow unit 22 during plowing operations. The wheel 52 has associated therewith an axle having an upturned extension 56 which projects through a vertical bearing sleeve. The front side of the trailer section 50 is pivotally connected by means 64 to the rear end of the main beam 20. A lift cylinder or hydraulic ram 70 is provided such that as the lift cylinder 70 is extended, the wheel 52 is raised relative to main beam 20 or, conversely, to lower the main beam for plowing purposes. When the lift cylinder 70 is contracted, the rear end of the main beam 20 is raised and withdraws the plow units 22 from the ground, in which case the wheel 52 functions as a traction wheel for transport purposes.

Whether the wheel 52 is in its plow-raising or its plow-lowering position, steering means are effective whereby such wheel will automatically be steered in a direction opposite to that in which the tractor may be turning so that the trailer section 50 will swing around behind the tractor and the trailing end of the main beam 20 will move outwardly and be maintained behind the tractor in a manner similar to the steering of an extremely long fire truck or a similar vehicle. Accordingly, and as best shown in FIG. 1, a crank arm 80 has its proximate end effectively fixed through the medium of the pivotal connection 14 to a point on the laterally adjustable hinge block 13 in a manner that will be described in greater detail presently, such crank arm overhanging the left side of the pull frame. A linkage system including three elongated steering links 82, 84, and 86 are connected together in end-to-end fashion by means of T-bar connectors 88 and 90. The forward tie rod 82 has its front end pivoted to the distal end of the crank arm 80 while the rear end of the rearmost tie rod 86 is pivoted to a steering knuckle 92 which is mounted on the upper end of the vertical upturned extension 56 of the axle of the steering wheel 52. Thus it will be seen that as the tractor 12 and its hitch 10 turn in one direction or the other, the crank arm 80 will follow the turning motion of the hitch block 13, but in the opposite direction, thereby placing the tie rods 82, 84 and 88 either under compression or under tension, depending upon the direction of turning movement of the tractor. For example, if the tractor turns to the left, the tie rods will be placed under compression and their endwise displacements will be such that the steering knuckle 92 will turn in a clockwise direction as viewed in FIG. 1 so as to shift the wheel axle in a direction which will guide the tail section to the right. If the tractor turns to the right, the tie rods will be placed under tension and the wheel 52 will turn in a counterclockwise direction so as to guide the tail section to the left.

Considering now in greater detail the nature of the hitch connection 10 and of the pivot connection 14 associated therewith, such hitch 10 is comprised of a pair of tractor mounts 94 which are bolted to tractor lugs 95 (FIG. 1) provided on the rear axle 96 of the tractor 12. A combined guide rod and hinge bar 97 extends between the tractor mounts 94 and the aforementioned hitch block 13 has its proximate or front end slidable on the bar 97. The distal or rear end of the hinge block 13 is pivotally connected to the forward end region of the pull bar 16. A hydraulic piston and cylinder assembly (hydraulic ram) 93 has its plunger end effectively secured to the right tractor mount 94 and has its cylinder end effectively secured to the hitch block 13. It will be appreciated that when the hydraulic ram 93 is extended, the hitch block 13 will be shifted along the hinge bar 97 to the left and that when such ram is contracted the hitch block will be shifted to the right. The aforementioned hinge connection 14 between the forward end of the pull frame 16 and the hitch 10 embodies an upstanding pivot shaft 100, the lower end of which is fixedly secured to the hinge block 13 and which extends upwardly through a sleeve that extends through the forward end region of the pull frame 16. The aforementioned crank arm 80 has a hub portion which is pinned to the shaft 100 so that it turns with the latter while the pull frame 16 and its associated sleeve is capable of limited swinging movement about the axis of the pivot shaft 100.

The hydraulic ram 93 which controls the lateral position of the pivot connection 14 (which will hereinafter be referred to as the hitch point) is hydraulically phased with two other hydraulic rams 91 and 99 (FIG. 1). The hydraulic ram 91 has its plunger end effectively pivoted to a medial region of the pull frame 16, and its cylinder end effectively pivoted to the forward end of the main frame 20. The ram 91 thus controls the angle which is subtended between the pull frame 16 and the main frame 20. The ram 99 has its cylinder end effectively pivoted to a rear medial region of the main frame 20, and its plunger end effectively pivoted to the distal end of a positioning arm 106 which is fixed to the trailer section 50. The ram 99 thus controls the angle which is subtended by the longitudinal axes of the main frame 20 and the trailer section 50.

If desired, a second support wheel 110 may be mounted on the forward end region of the trailing section 50 and it is capable of being vertically adjusted by suitable means (not shown) so that it will engage the ground during plowing to limit the depth of the furrows. The use of such depth gauge wheels is well known in the art and, during transport, such wheels are raised from the ground.

The operation of the herein described plow system is fully set forth in copending application D-9708 by Gerald G. Ward, Ser. No. 830,713, filed Sept. 6, 1977, entitled "Plow System" and for a full understanding thereof, reference may be had to such patent. The three hydraulic rams 93, 91 and 99 are hydraulically serially phased together so that by the use of a single control valve in the operator's cab, the three cylinders 93, 91 and 99 may be actuated in unison to vary, firstly the lateral position of the hitch point 14, secondly, the angle between the pull frame 16 and the main frame 20, and thirdly, the angle between the longitudinal axes of the main beam 20 and the trailer section 50. The hydraulic rams 93, 91, and 99 are of the type disclosed in copending application D-3291 by Gerald G. Ward., Ser. No. 834,628, filed Sept. 19, 1977, entitled "Improved Cylinder Construction Affording Automatic Re-Phasing of Master and Slave Cylinders". The purpose of varying the position of the hitch point 14 and these angles in this manner is to position and maintain the plow-carrying main frame 20 at the optimum angle with respect to the direction of travel of the tractor 12 so that a proper line of draft will be maintained for each condition of plow unit spacing.

In FIGS. 2 through 5 there is shown a cast mounting bracket 120 supporting a plow bottom through a toggle trip mechanism of the type shown in the previously mentioned U.S. Pat. No. 3,910,354. The plow bottom and toggle trip mechanical includes a shank 111, a horizontal arm 112, upstanding arm 113 forward toggle link 14 and rear toggle link 115. The mounting bracket 120 is formed as a casting and includes a flat upper surface 122 and a raised hub portion 121. A vertical post 123 is connected at its bottom end to the mounting bracket and extends upwardly therefrom terminating in a free upper end.

The cast mounting bracket 120 has a vertically extending opening formed in the raised hub portion 121 into which the steel vertical post is connected by an interference or shrink fit, or a chemically bonded connection. It should be understood that the vertical post and mounting bracket could be forged or cast, for example in steel or nodular iron as an integral piece. Also the mounting bracket could be forged or fabricated or made of various combinations of these. Extending downwardly from the mounting bracket 120 is a portion having a vertical surface 124 having a pair of holes 125 formed therethrough. The vertical surface 124 and holes 125 function to secure coulter bar 30 to the mounting bracket 120. As best seen in FIG. 5 the coulter bar 30 extends forwardly and carries a coulter 28 at its forward extremity. It should be noted that through this coulter mounting the coulter is pivoted along with the mounting bracket 120 when it pivots about vertical pivot 36. It should also be noted that the coulter bar 30 is immediately below main frame 20 thus maximizing the trash clearance beneath the main frame. Extending upwardly from the rear portion of mounting bracket 120 is the tool mounting section which provides a horizontal pivotal mount 127 for the horizontal arm 112 plow shank 111 and means 128 for mounting the forward toggle link 114. It should be noted that the entire tool mounting section is above the coulter bar 30 and thus does not create an obstacle to trash moving under the main frame 20. As best seen in FIG. 4 a vertical bearing 130 is secured by welding or the like to the main frame 120 and forms the pivotal support for said mounting bracket 120. The vertical post 123 extends upwardly through the vertical bearing 130 and a ring like member 131 is secured to the free end of the vertical post 123 that extends through the vertical bearing. The ring like member can be secured to the vertical post by a pin 132. It should be noted that this plow mounting bracket shortens the moment arm between the plow bottom and the main frame because the only connection between the hub portion of the mounting bracket and the vertical post is below the main frame. Shortening of this moment arm results in lower forces and thus permits a more compact design.

In FIG. 6 the tool mounting section 126 of the mounting bracket 120 differs from that previously described since it is designed to provide a mounting for plow trip mechanism of the type shown in the previously mentioned U.S. Pat. No. 3,321,027. The purpose for showing two different plow trip mechanisms is to illustrate how the subject mounting bracket can function to mount plows having any types of trip mechanism. It should be noted that the crank arms 37, 40 and 42 shown in FIG. 1 are connected to the mounting brackets 120 by nuts and bolts 129 as can be seen in FIG. 5.

In FIG. 3 a securing nut and bolt 140 is illustrated which extends through aligned holes in the mounting bracket and the main frame 20. A plurality of holes 141 are formed in the mounting bracket 120 located along an arc centered at the vertical post 123 to thus permit the plow bottom to be secured by the securing nut and bolt 140 in one of several selected positions. A washer or sleeve 142 is provided to fill the gap between this portion of the mounting bracket 120 and the main frame 20. Of course if the securing nuts and bolts 140 are to be utilized all the linkage mechanism 37-44 can be eliminated. Likewise the hydraulic cylinders 93, 91 and 99 can be eliminated to thus provide an economical adjustable plow.

From the above description it is believed that the nature and many advantages of the present plow mounting bracket that can be used in a plow system having the ability to adjust furrow width during operation or in a manually adjustable plow system has been disclosed.

The invention is not to be limited to the exact arrangement of parts shown in the accompanying drawings or described in this specification as various changes in the details of construction may be resorted to without departing from the spirit of the invention. For example, whereas the invention has been illustrated and described in connection with a plow system having five plow units 22, it is obvious that a greater or a lesser number of plow units may be employed. Therefore, only insofar as the invention has particularly been pointed out in the accompanying claims is the same to be limited.

What is claimed is:

1. A plow of the type adapted to be pulled by a traction vehicle and including a main frame having a horizontal beam inclined relative to the direction of travel of said vehicle, said horizontal beam having upper and lower surfaces, and a plurality of plow bottoms supported by said horizontal beam wherein the improvement comprises:

for each of said plow bottoms;

a vertical bearing secured to said horizontal beam, a plow bottom mounting bracket pivotally supported on said horizontal beam by said vertical bearing, said mounting bracket having flat upper and lower surfaces and a hub portion formed thereon and extending above and below said bracket surfaces, said surfaces extending laterally and forwardly of said hub portion, said bracket also having a horizontal plow pivotal mount located adjacent and rearward of said hub portion, a vertical post having upper and lower ends, the lower end of said vertical post being positively connected to said hub portion for rotation therewith and extends upwardly therefrom terminating in a free upper end, such that when said free upper end of said vertical post is inserted through said vertical bearing the hub portion provides beam working support and said flat upper surface of the mounting bracket is in close proximity and parallel to the lower surface of said horizontal beam, said mounting bracket further including a tool mounting section that extends upwardly from said flat upper surface, means retaining said vertical post in said vertical bearing such that pivotal movement therebetween is permitted, means for fixing said plow mounting bracket relative to said main frame at selected positions, and trip linkage means connecting the plow bottom to said mounting section.

2. The invention as set forth in claim 1 wherein said plow mounting bracket includes a vertical surface that extends downwardly from said flat upper surface, means formed in said vertical surface for connecting a coulter to said plow mounting bracket such that it pivots therewith.

3. The invention as set forth in claim 2 wherein means are provided for mechanically securing each of the plow bottom mounting brackets to the horizontal beam at selected relative positions.

4. The invention as set forth in claim 2 wherein said plow mounting bracket and said vertical post are formed of a single integral unit.

5. The invention as set forth in claim 1 wherein said mounting bracket is formed as a casting and said vertical post is a steel bar that is connected to said casting by an interference fit.

6. The invention as set forth in claim 5 wherein means are provided for mechanically securing each of the plow bottom mounting brackets to the horizontal beam at selected relative positions.

7. The invention as set forth in claim 1 wherein the plow mounting bracket for each of the plurality of plow bottoms are interconnected through a linkage system such that all of the plow bottoms are pivoted together.

8. The invention as set forth in claim 7 wherein power actuated means are provided on said main frame and connected to said linkage system that will permit the traction vehicle operator to pivot the plow bottoms during operation of the plow.

9. The invention as set forth in claim 1 wherein means are provided for mechanically securing each of the plow bottom mounting brackets to the horizontal beam at selected relative positions.

10. The invention as set forth in claim 1 wherein said plow mounting bracket and said vertical post are formed of a single integral unit.

11. A plow of the type adapted to be pulled by a traction vehicle and including a main frame having a horizontal beam inclined relative to the direction of travel of said vehicle, said horizontal beam having upper and lower surfaces, and a plurality of plow bottoms supported by said horizontal beam wherein the improvement comprises:

for each of said plow bottoms;

a vertical bearing secured to said horizontal beam, a plow bottom mounting bracket pivotally supported on said horizontal beam by said vertical bearing said mounting bracket having a flat upper surface and a hub portion formed thereon, a vertical post having upper and lower ends, the lower end of said vertical post being positively connected to said hub portion for rotation therewith and extends upwardly therefrom terminating in a free upper end, such that when said free upper end of said vertical post is inserted through said vertical bearing the hub portion provides beam working support and said flat upper surface of the mounting bracket is in close proximity and parallel to the lower surface of said horizontal beam, said mounting bracket further including a single tool mounting section that extends upwardly from said flat upper surface terminating in a free upper end and is located adjacent a side of said horizontal beam, means retaining said vertical post in said vertical bearing such that pivotal movement therebetween is permitted, means for fixing said plow mounting bracket relative to said main frame at selected positions, and trip linkage means connecting the plow bottom to said free upper end of said tool mounting section.

* * * * *